(12) United States Patent
Zeng et al.

(10) Patent No.: US 7,957,305 B2
(45) Date of Patent: Jun. 7, 2011

(54) HIERARCHICAL CABLE MODEM CLONE DETECTION

(75) Inventors: Shengyou Zeng, Concord, MA (US); Hemant Singh, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 1085 days.

(21) Appl. No.: 11/465,107

(22) Filed: Aug. 16, 2006

(65) Prior Publication Data

US 2008/0126540 A1    May 29, 2008

(51) Int. Cl.
H04L 12/26 (2006.01)
H04L 12/28 (2006.01)
H04B 3/46 (2006.01)

(52) U.S. Cl. ........ 370/252; 370/389; 370/401; 375/222; 709/225

(58) Field of Classification Search .................. 709/225; 370/252, 329, 389, 401
See application file for complete search history.

(56) References Cited

U.S. PATENT DOCUMENTS

| | | | |
|---|---|---|---|
| 5,655,120 A * | 8/1997 | Witte et al. .................. | 718/105 |
| 5,918,019 A | 6/1999 | Valencia | |
| 6,137,793 A | 10/2000 | Gorman et al. | |
| 6,189,102 B1 * | 2/2001 | Beser .............................. | 726/2 |
| 6,819,682 B1 | 11/2004 | Rabenko et al. | |
| 7,065,779 B1 | 6/2006 | Crocker et al. | |
| 7,113,484 B1 * | 9/2006 | Chapman et al. ............. | 370/252 |
| 7,139,923 B1 | 11/2006 | Chapman et al. | |
| 7,194,009 B2 * | 3/2007 | Eng ................................ | 370/480 |
| 7,512,969 B2 * | 3/2009 | Gould et al. ....................... | 726/4 |
| 2002/0052927 A1 | 5/2002 | Park | |
| 2002/0093955 A1 | 7/2002 | Grand et al. | |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2004/0163129 A1 | 8/2004 | Chapman et al. | |
| 2004/0244043 A1 | 12/2004 | Lind et al. | |
| 2005/0114880 A1 | 5/2005 | Gould | |
| 2005/0254489 A1 * | 11/2005 | Jain et al. ....................... | 370/389 |
| 2005/0265376 A1 | 12/2005 | Chapman et al. | |
| 2005/0265392 A1 | 12/2005 | Chapman et al. | |

(Continued)

FOREIGN PATENT DOCUMENTS

WO    00/72509    11/2000

OTHER PUBLICATIONS

Postel, J., "User Datagram Protocol", RFC 768, Aug. 28, 1980, 3 pgs.

(Continued)

Primary Examiner — Melanie Jagannathan
(74) Attorney, Agent, or Firm — Marger Johnson & McCollom, P.C.

(57) ABSTRACT

A hierarchical cable modem clone detection system: A cable modem clone detection system uses a cable modem media access control (MAC) address and physical location information such as information relating to a cable interface, upstream and downstream port numbers, fiber node information, and load balancing group descriptors to determine if a cable modem is a clone. The hierarchical approach first make a clone determination at a cable modem termination system, then at a regional operations center and finally at a network operations center.

20 Claims, 8 Drawing Sheets

U.S. PATENT DOCUMENTS

2005/0265397 A1  12/2005  Chapman et al.
2006/0168612 A1   7/2006  Chapman et al.
2007/0076705 A1*  4/2007  Semon et al. .................. 370/389
2007/0276943 A1* 11/2007  Marez et al. .................. 709/225

OTHER PUBLICATIONS

Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Desai, et al., FastChannel: A Higher-Speed Cable Data Service, AT&T Labs-Research, pp. 1-13.
Adoba, et al., Extensible Authentication Protocol (EAP), RFC 3748, Jun. 2004, pp. 1-64, Standards Track.
ITU-T Telecommunication Standardization Sector of ITU, Series J: Cable Networks and Transmission of Television, Sound Programme and Other Multimedia Signals, Interactive Systems for Digital Television Distribution, Recommendation J.122, Dec. 2002, 506 pages, International Telecommunication Union.
Communications Technology, "Don't Let Your Modem Be Cloned," Madinsky, S. and Anderson, S., Jun. 2000 (7 pages).
Communications Technology, Archives, "Theft of Service-Inevitable?," Millett, M., Dec. 2005, (4 pages).

* cited by examiner

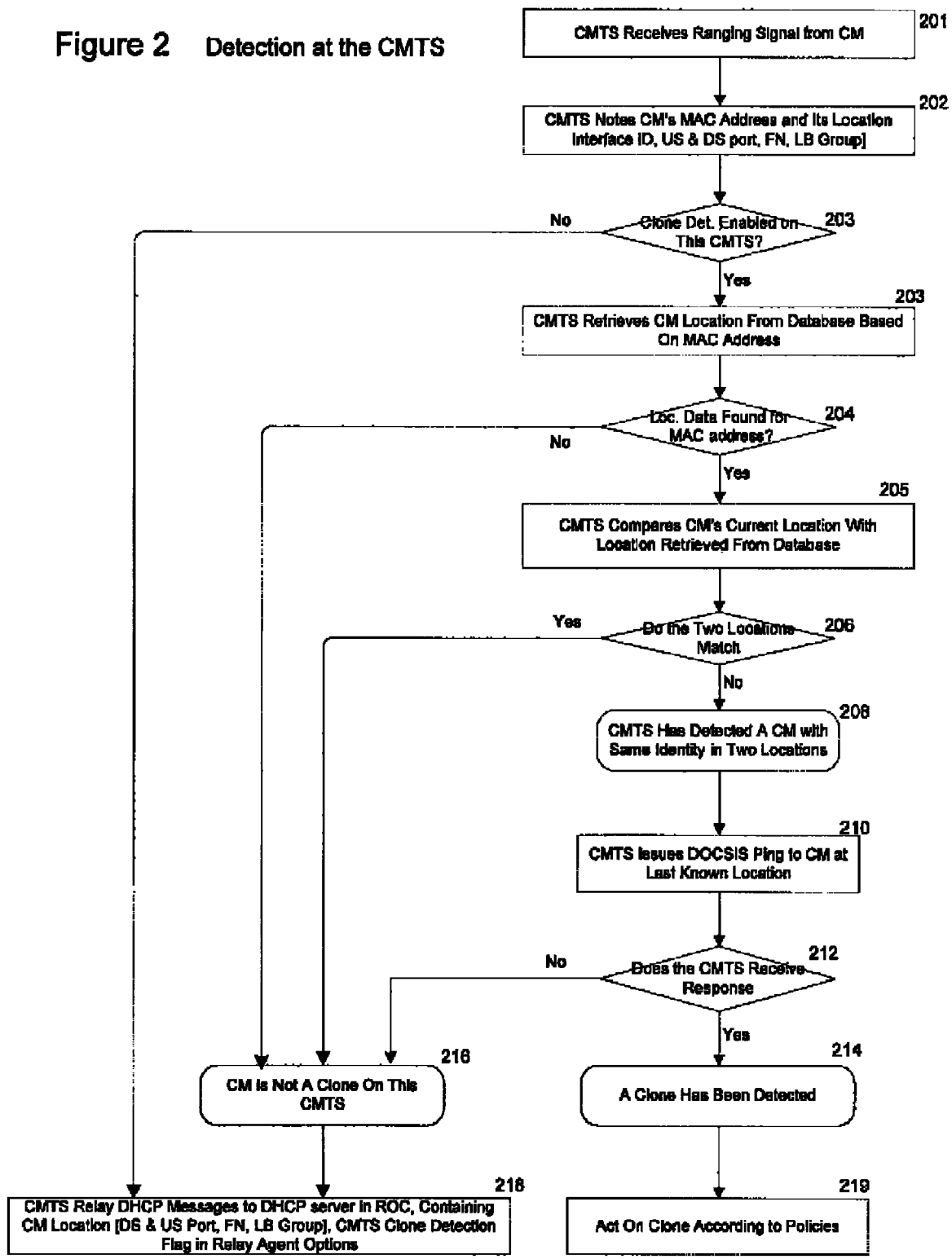

Detection At the ROC

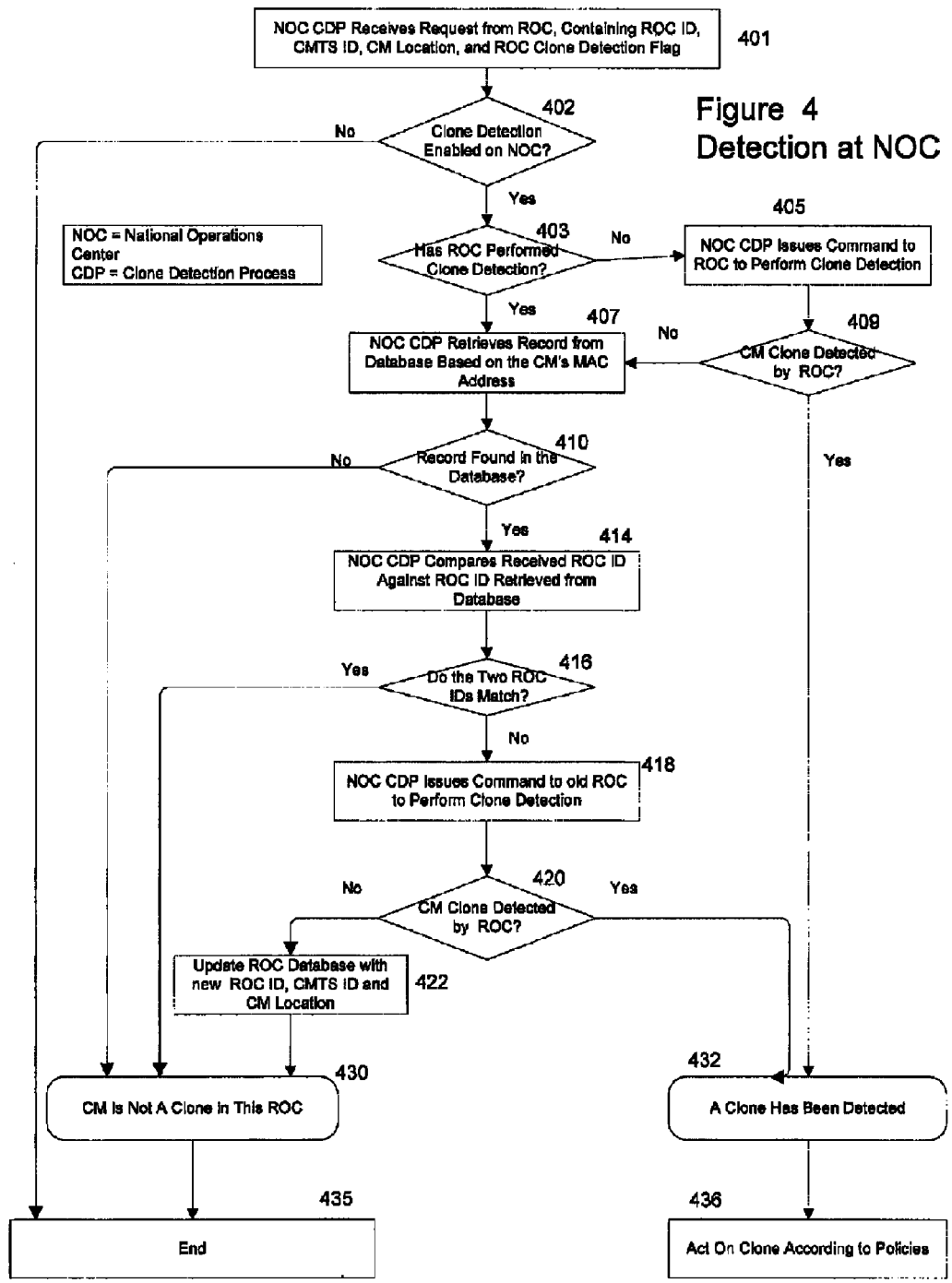

Figure 5 (CMTS)
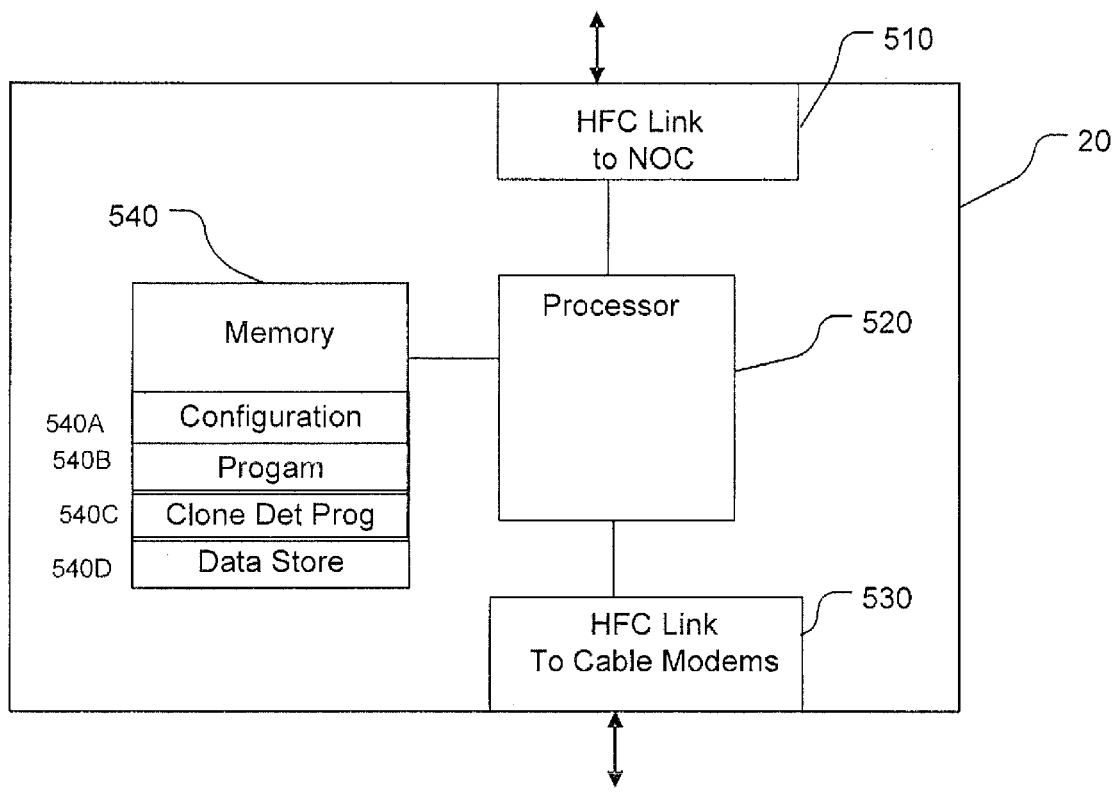

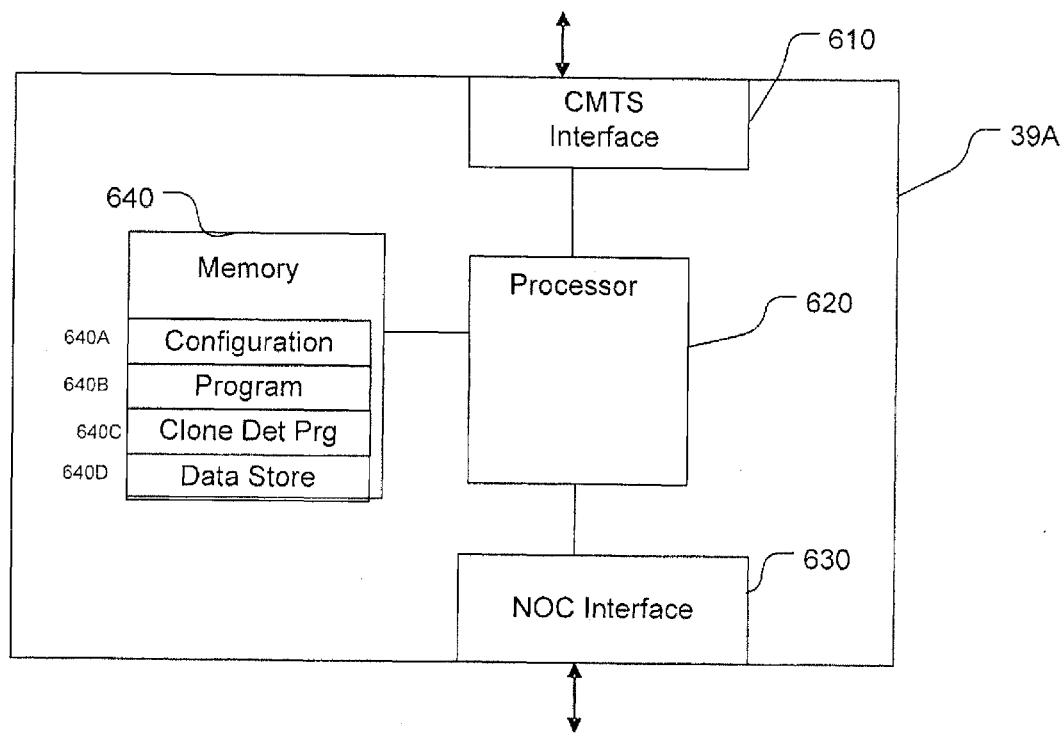
Figure 6 (ROC DHCP Server)

Figure 7 (NOC Server)
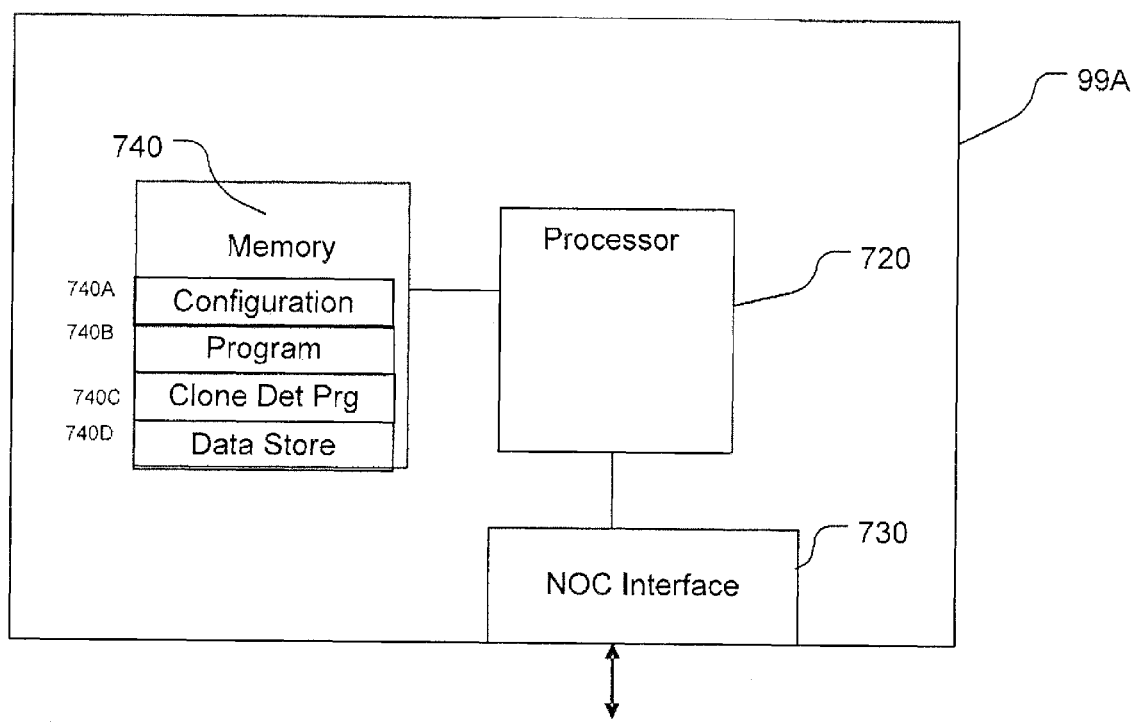

HIERARCHICAL CABLE MODEM CLONE DETECTION

FIELD OF THE INVENTION

The preset invention relates to broadband technology for providing Internet services and more particularly to systems that include cable modems.

BACKGROUND

Cable modems are often used to provide broadband services over cable television networks. The cable modem interconnects end user devices to a coaxial cable that transmits data to a cable modem termination system (CMTS). Cable modems are usually located in a customer's premises and frequently they are in part managed by end users. Thus, cable service providers do not usually have complete control of the cable modems connected to their systems.

Cable service providers sometimes experience theft of service. The theft is frequently accomplished by use of "cloned" cable modems. Cable modems can be cloned in many ways. A common method is to clone a cable modem's media access control (MAC) address. A MAC address is a globally unique address associated with networking hardware. A cable modem that only duplicates a MAC address from another cable modem is often called a simple clone. Since legitimate MAC addresses are unique for each piece of hardware, service providers often manage services based on the MAC addresses. This makes it possible for someone to steal cable service by duplicating a MAC address from a cable modem that is legitimately provisioned for service.

Cable modems can be cloned in various other ways than by merely copying the MAC address. For example, a modem may be cloned by copying the firmware, service profiles, or the baseline privacy interface (BPI) certificates. When more than just the MAC address of a modem is cloned, the cloned cable modem is often referred to as a perfect clone.

BRIEF DESCRIPTION OF THE DRAWINGS

FIG. 2 is a flow diagram of operations at the CMTS shown in FIG. 1A.

FIG. 4 is a flow diagram of the operation at the NOC shown in FIG. 1B.

FIG. 5 is a block diagram of the relevant parts of the CMTS shown in FIG. 1.

FIG. 6 is a block diagram of a ROC server shown FIG. 1A.

FIG. 7 is a block diagram of a NOC server shown in FIG. 1A.

DETAILED DESCRIPTION

Figure 1A:
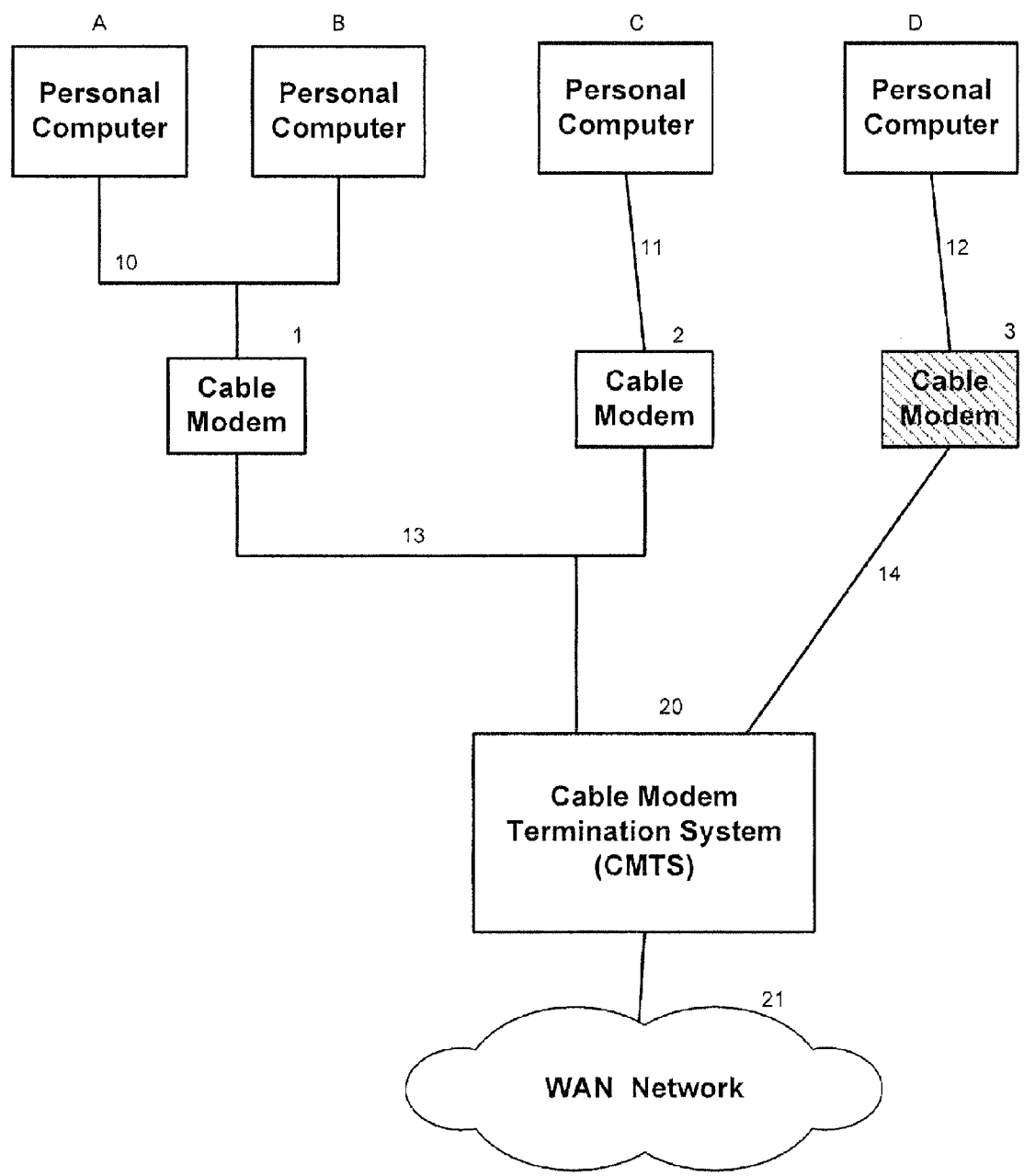
FIG. 1A is a diagram of a CMTS and modems in a first embodiment.

The following abbreviations are used in this detailed description:
  MAC address: Media Access Control address: A MAC address is a unique code assigned to most forms of networking hardware. A MAC address is also sometimes referred to as a hardware address or as an Ethernet address.
  DOCSIS: Data Over Cable Service Interface Specification: The DOCSIS specifications are publicly available from the CableLabs Inc. website. The DOCSIS 1.0, 1.1, 2.0, and 3.0 specifications are available.
  BPI: Baseline Privacy Interface: The BPI specification is publicly available from the CableLabs Inc. website.
  BPI+ Baseline Privacy Interface plus: The BPI+ specification is publicly available from the CableLabs Inc. website.
  CMTS Cable Modem Termination System: A device for connecting modems attached to a coaxial cable network to a data network like the Internet.
  US Port A port on a CMTS that receives data transmitted from a cable modem to the CMTS. The data transmitted includes data from the modem's end user.
  DS port A port on a CMTS that is used to transmit data to a cable modem and to its end user.
  ROC Regional Operating Center: A center with a system providing connectivity and services to a number of CMTS systems.
  NOC Network Operating Center: A center with a system providing connectivity and services to a number of ROC's. Where a network covers an entire country, the term NOC can stand for National Operating System.
  HFC Hybrid Fiber Coaxial: a telecommunication technology that uses optical fiber cable and coaxial cable in different portions of a network to carry broadband content.

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the embodiments to those skilled in the art. Those parts and elements not shown are conventional and known in the art.

The embodiments described herein utilize a hierarchical clone detection method for detecting cable modem clones. Clones are detected globally in the cable service provider's network. Once a clone is detected, a service provider has the option of stopping the cable modem clone from receiving cable services.

It is particularly noteworthy that the cable modem clone detection technique described herein does not require changes to standard cable modems. The technique described herein works on systems utilizing DOCIS 1.0, 1.1, 2.0, or 3.0 as well as modems of future DOCSIS versions. It is noted that with respect to modems deployed in the future, there is potential for changing some software or hardware to prevent cloning; however, even if such changes are made on future modems such changes will be not effective relative to modems previously deployed. The technique described herein does not require any software or hardware changes in the cable modem and hence it will work relative to previously deployed modems.

Another aspect of the clone detection technique described herein is that it doesn't rely on the BPI+ protocol. This means that the technique described herein is effective against pre-BPI+ modems (i.e., DOCSIS 1.0). Furthermore even if a hacker disables BPI+ on a cloned modem, the cloned modem can be detected. There are methods to prevent hacking and cloning of BPI+modems. However, such techniques generally only prevent cloning when the modem supports BPI+ and only when BPI+ is enabled. The technique described herein detects modem clones of non-BPI+ modems as well as clones of BPI+ modems. Furthermore, the technique described herein detects clones of BPI+ modems even if the BPI+ is disabled.

It is noted that the first part of the technique described herein can detect the existence of clones but it cannot distinguish which cable modem is the original and which is the clone. To distinguish a clone from the original, the technique relies on back-office information as will be described. This method can rely on BPI+ to distinguish a simple clone from the original. But even BPI+ cannot distinguish a perfect modem clone from the original.

FIG. 1A is an overall block diagram of a cable modem system that will be used to explain a first preferred embodiment of the present invention. As illustrated in FIG. 1A, a number of computers designated A, B, C and D are connected to cable modems 1, 2 and 3 by local area networks (LANs) 10, 11 and 12. The cable modems 1, 2 and 3, are in turn connected to cable modem termination system (CMTS) 20 via HFC cables 13 and 14. The CMTS 20 is in turn connected to the wide area network 21 (WAN) in a usual manner.

It is noted that the four computers and three cable modems illustrated in FIG. 1 are representative and that the system can include any number of computers and cable modems up to the conventional type of system capacity constraints. It is also noted that multiple computers can be connected to a single cable modem, as is the case with modem 1. Likewise multiple modems can share a single HFC connection to the CMTS as is the case with cable 13. Thus, the configuration shown in FIG. 1 is merely meant to be representative of a system with multiple end units and multiple cable modems connected to a CMTS.

Figure 1B:
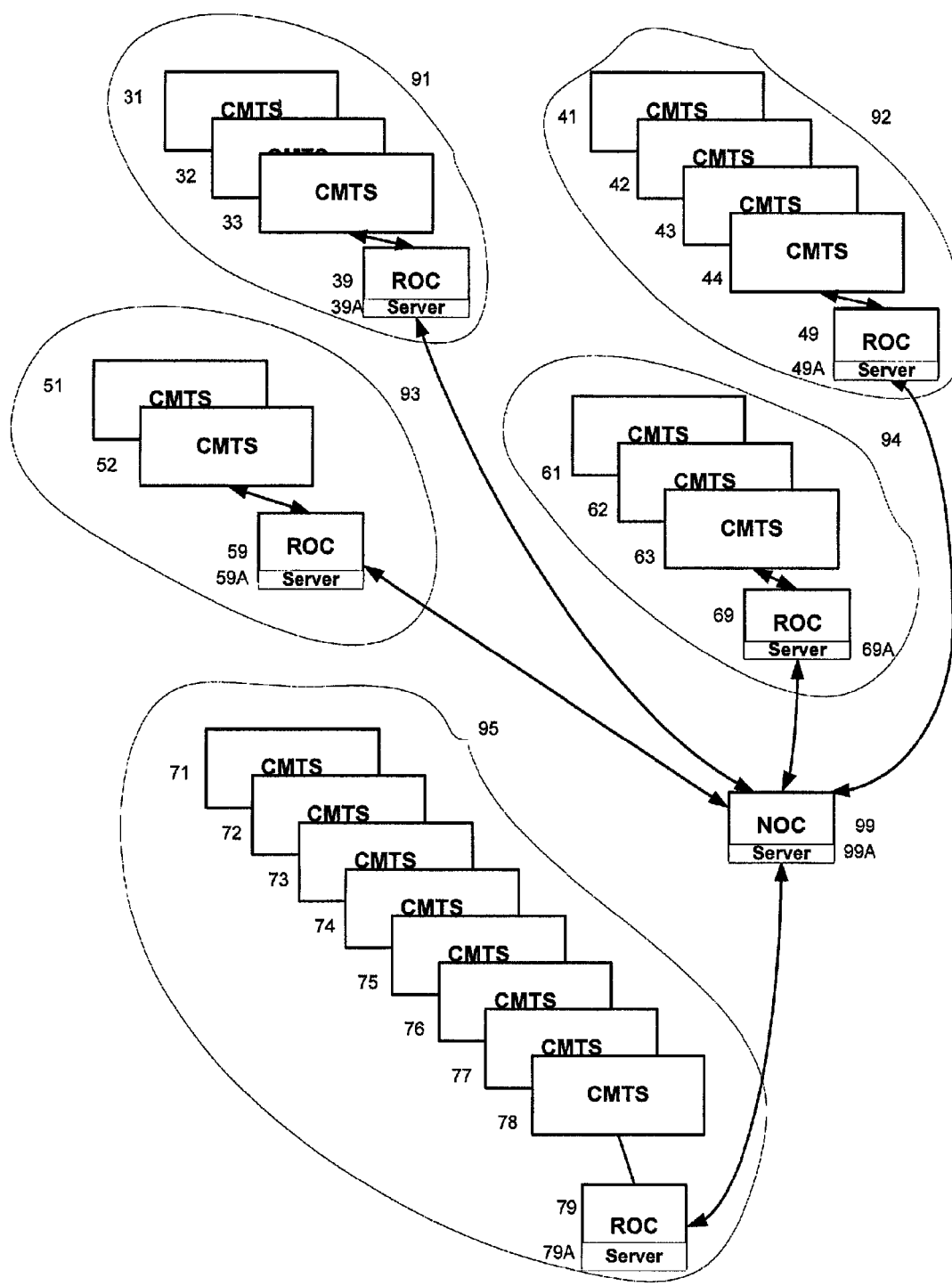
FIG. 1B is an overall diagram of a first embodiment.

FIG. 1B illustrates a network that includes multiple CMTS systems arranged in a number of regions. The entire network has a Network Operations Center (NOC) 99. The CMTS systems shown in FIG. 1B are arranged in five regions designated 91 to 95. Region 91 includes CMTS systems 31 to 33, region 92 includes CMTS systems 41 to 44, region 93 includes CMTS systems 51 and 52, region 94 includes CMTS systems 61 to 63, and region 95 includes CMTS systems 71 to 78. The number of CMTS systems in each region is variable.

The numbers of CMTS systems in each region and the number of regions shown in FIG. 1B are merely meant to be illustrative of a typical system. The number of CMTS systems in any region and the number of regions is variable. The network may cover an entire country and in such a case the NOC would be a National Operations Center.

Each region has a regional operating center (ROC). Region 91 has a ROC 39, region 92 has a ROC 49, region 93 has a ROC 59, region 94 has a ROC 69, and region 95 has a ROC 79. Each ROC in turn includes one or more DHCP servers. In the embodiment shown here, each ROC includes only one DGCP server. ROC 39 includes DHCP server 39A, ROC 49 includes DHCP server 49A, ROC 59 includes DHCP server 59A, ROC 69 includes DHCP server 69A, and ROC 79 includes DHCP server 99A.

The CMTS systems in each region are connected to the region's ROC and the various ROC's are connected to the NOC 99. The connections can be any of the usual type of high speed connections such as fiber optic cable etc.

It is noted that the embodiment shown in FIG. 1B has three levels in the network organization. Other embodiments involve various other levels of network organization. The principles of operation are the same regardless of the number of levels in the network.

As usual, each CMTS system has connections to a relatively large number of cable modems as shown in FIG. 1A (but not shown in FIG. 1B for ease of illustration). Each ROC and the NOC 99 can include a number of servers as is usual. FIG. 1B only shows the one server in each NOC and in the ROC. The servers in the ROC's and NOC illustrated in FIG. 1B are the servers that perform the clone detection process described herein.

In the exemplary embodiment illustrated in FIG. 1A, cable modem 3 is what is often referred to as a "perfect clone". This means that more than just the MAC address from a legitimate cable modem has been cloned. For example, in addition to the MAC address, some or all of the firmware, the service profiles, or the baseline privacy interface (BPI) certificates have been copied from a legitimately provisioned cable modem may have been cloned.

The hierarchical cable modem clone detection technique described herein can be divided into the following three major parts:
1. Move detection,
2. Physical location verification, and
3. Dealing with the clone.

In the specific embodiment described herein, where the network has three levels, the move detection part of the technique has the following three sub-parts.
 a) Move detection at the CMTS level,
 b) Move detection at a Regional Operations Center (ROC), and
 c) Move detection at the Network Operations Center (NOC).

In other embodiments that include a different number of levels, there would be a move detection sub-part for each level in the network.

Move detection determines if a particular cable modem has appeared at a different point of attachment since last time the particular cable modem was online. As indicated above, move detection is performed at three levels. The first level of move detection is performed at the CMTS. The second level of move detection is performed at a regional level. The third level of move detection is performed on a global or NOC level.

Each level of move detection takes into account the information available at that level. That is, the first level detection determines if a modem has moved between two locations serviced by a single CMTS system. The information stored in one particular CMTS can tell if a modem has moved between locations on that particular CMTS.

The second level of move detection determines if a cable modem has moved between CMTS's in a region. The information stored in each ROC can tell if a cable modem has moved between CMTS's in one region.

The third level of move detection determines if a cable modem has moved between regions in network. The information stored in the NOC can tell if a cable modem has moved between regions in a network.

The clone detection technique described herein first operates on the basis of information concerning the cable modems that have been connected to a single CMTS. The technique next operates on the basis of information concerning the cable modems that have been connected to all the CMTS's in a region. Finally, the technique operates based upon information concerning all the cable modems that have been connected to the entire network. It is noted that other embodiments involve and operate on the basis of other hierarchal divisions and arrangements as indicated above.

A CMTS stores, in an internal datastore, the MAC addresses of all the cable modems that have been previously connected to that CMTS (naturally, this is since a reset of the data store). The CMTS also stores information concerning the physical location of each cable modem that has been connected to the CMTS. That is, for each MAC address stored in the CMTS, the CMTS stores data concerning the physical location of the modem with that MAC address when that modem registered with the CMTS. That is, the location information stored is the physical location information obtained when a modem with a particular MAC address connects to the CMTS.

In the embodiments described herein, a cable modem's physical location is specified by the following information:
 (a) The cable interface on which the modem appears,
 (b) The US and DS ports on the interface that service the modem,
 (c) The Fiber Node (FN) serving the cable modem, and
 (d) The Load Balancing (LB) group descriptor on the CMTS.

It is noted that multiple US and DS ports can be part of one LB group. When an LB group is configured on a CMTS, the CMTS can move an online cable modem to a different US port and/or a different DS port. This creates special situations that need be addressed as discussed below.

The technique described herein is hierarchical. That is it first operates at a CMTS level, then it operations at a regional operating center (ROC) level and finally it operates at a Network Operating Center (NOC) level.

Figure 3:
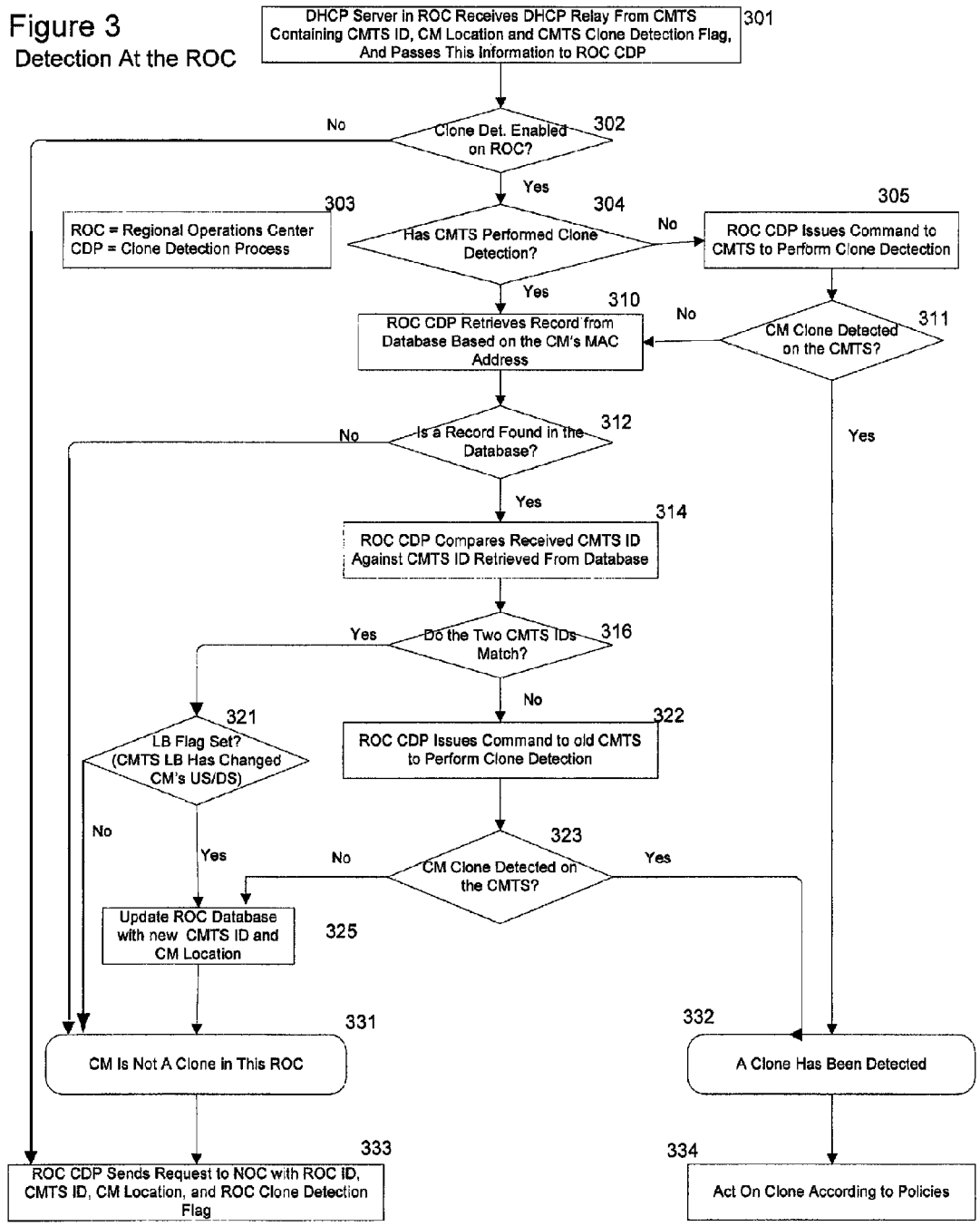
FIG. 3 is a flow diagram of operation at the ROC shown in FIG. 1B.

FIGS. 2, 3, and 4 are flow diagrams of the operations performed by the first embodiment described herein. FIG. 2 shows the operations performed at the CMTS. FIG. 3 shows the operations performed by a program on a server located at the ROC. FIG. 4 shows the operations performed by a program stored on a server located at the NOC.

The process will now be explained with reference to FIGS. 2, 3 and 4. As indicated by block 201 in FIG. 2, when a cable modem comes online, it performs ranging. During the ranging operation the modem adjusts it's transmit power, frequency and timing as necessary to compensate for the distance between the modem and the CMTS. As indicated by block 202, during the ranging process, the CMTS notes and stores the cable modem's MAC address, interface ID, US & DS ports, FN and LB Group.

Clone detection can be disabled on a CMTS in order to conserve processing power and speed up operations or for various other reasons. Thus, as indicated by block 203, a check is made to determine if the CMTS is enabled for clone detection. If clone detection is not enabled the process goes directly to the ROC as indicated by block 218.

If clone detection is enabled, the CMTS looks up in the CMTS's internal datastore to determine whether the cable modem is already registered with the CMTS as indicated by block 203. If the CMTS doesn't find the cable modem MAC address in its datastore, it means that the cable modem is new to the CMTS. In this case the modem can not be a clone of another modem on that CMTS. That is, the cable modem is not a clone as far as this CMTS can determine (block 216) and the process moved to the ROC as indicated by block 218.

If the CMTS finds the cable modem's MAC address in its datastore, then a cable modem with that MAC address was previously registered with this CMTS. In this case, the CMTS compares the cable modem's current physical location with the physical location data retrieved from the CMTS's datastore as indicated by block 205. The items compared include (a) the interface number, (b) the US port number, and the DS port number (c) the fiber node, and (d) the load balancing group identity.

If the physical locations determined by the data in the datastore and the physical location determined from the data received during ranging match, it means that the cable modem has not moved and that it is not a clone on this CMTS as indicated by block 216. The process then moves to the ROC as indicated by block 218.

When the physical locations don't match (block 208), whether or not the cable modem has moved depends on whether LB is configured on the CMTS. If LB is not configured on the CMTS, then the detection of physical location change indicates that the cable modem has moved and that it may be a clone.

If LB is configured on the CMTS, then US and/or DS ports may have changed as a result of an LB operation. Thus the change in physical location data doesn't necessarily indicate that the cable modem has physically moved. However, it is possible that at the same time that an LB operation moves a cable modem to new US and/or a new DS port, a clone may attempt to come online from the cable modem's old DS and US. Stated differently, a clone may appear coinciding with an LB operation change.

Since a clone may come online at the time that an LB operation changes ports, the clone detection process must further examine the existence of two cable modems with the same MAC address identifier appearing from two different physical locations at the same time. This is the situation even though the apparent physical location change is caused and controlled by the CMTS.

If the process detects that a cable modem MAC address is associated with two locations, the CMTS performs a DOCSIS ping (or some other operation that verifies the DOCSIS path) at the last known location as indicated by block 210. If no response is received, it means that the modem may have moved and that the modem may not be a clone. The process then moves to block 216. If a response is received it means that two cable modems exist with the same MAC address. That is two cable modems with the same MAC address exist in two different physical locations simultaneously. Thus, a clone has been detected as indicated by block 214 and appropriate action is taken as indicated by block 219.

It is noted that if the process detects that a cable modem MAC address is associated with two locations, the specific embodiment described herein performs a DOCSIS ping to the last known location. However, other embodiments use other types of operations that verify the DOCSIS path. Herein both a DOCIS ping and other operations that verify the DOCSIS path are referred to a DOCSIS ping.

The second level of cable modem move detection is at the regional operations center (ROC).

Once a cable modem completes ranging, it must establish IP connectivity through DHCP. The CMTS acts as the relay agent in the DHCP process, communicating information to the DHCP servers. As indicated by block 218, several pieces of information are communicated from the CMTS to the DHCP server located at the ROC. This information is stored and it is used to facilitate clone detection at the ROC.

The information transmitted to the DHCP servers includes:
 a) an IP address identifying the cable interface (link) on the CMTS where the DHCP client message is received from the cable modem.
 b) LB suboption: a flag that indicates whether or not the CMTS has moved the cable during load balancing.
 c) clone detection suboption: a flag indicating whether the CMTS has performed clone detection.

d) physical location suboption: a compound suboption that contains the interface #, US and DS port #, LB group Descriptor (if any), and FN name where the cable modem is attempting to come online.

The data that is transmitted to the DHCP server is encapsulated differently depending on whether the cable modem is acquiring an IPv4 or an IPv6 address. However, the information communicated from the CMTS to the DHCP server is the same even though it is encapsulated differently.

If the cable modem is acquiring an IPv4 address, the CMTS puts in the "giaddr" field the IPv4 address of the cable interface (link) where the cable modem's client DHCP message is received, and DHCP Option 82 suboptions for (b), (c) and (d) above. The giaddr is the link address of the cable interface.

If the cable modem is acquiring an IPv6 address, the CMTS puts in the "link-address" field of the Relay-Forward message the IPv6 address of the cable interface where the cable modem's client DHCP message is received, and options in the Relay-Forward message for (b), (c) and (d) above. Additionally, the CMTS will also use another option in the Relay-Forward message for the cable modem's MAC address.

Whether or not the Relay Agent Information Option in a DHCP packet contains a suboption for (b) depends on whether or not the CMTS has moved the cable modem to new US/DS in an LB operation. If a new cable modem is coming online or no LB operation has been performed on an online cable modem, then the Relay Agent Information Option doesn't contain a suboption for (b). Otherwise, if the CMTS has moved an online cable modem to new US/DS, then the Relay Agent Information Option contains a suboption for (b).

The DHCP server passes the location information data, link address of the cable interface, LB and clone detection flags, along with the cable modem's MAC address, to a process in the ROC that detects cable modem movement. This process stores the MAC addresses of cable modems and other information from the DHCP server associated with each cable modem.

The operations performed at the ROC are illustrated in FIG. 3. Block 301 illustrates the information received at the ROC. The first test indicated by block 302 is a test to determine if clone detection is enabled at the ROC. For a variety of reasons, the clone detection process may be disabled at the ROC. For example the clone detection might be disabled to conserve processing power. If clone detection is disabled at the ROC, the process moves to the NOC as indicated by block 333.

A check is then made as indicated by block 304 to determine if clone detection was enabled on the CMTS. That is, the CMTS clone detection flag is interrogated. If the CMTS did not perform clone detection, a command is issued to the CMTS to perform clone detection as indicated by block 305. Upon receiving the clone detection command, the CMTS performs a DOCSIS ping (Or some other path verification operation) as described above. If a clone is not detected by the CMTS (block 311) or if the CMTS has performed clone detection (block 304), the ROC clone detection process attempts to retrieve a record from its data base that relates to the cable modems MAC address.

If a record is not found, then the cable modem is new to the ROC, and the cable modem is not a clone insofar as this particular ROC) is concerned as indicated by block 331. The process then moves to the NOC as indicated by block 333. If a record for the MAC address is found in the ROC data base, the ROC clone detection process compares the CMTS ID (that is, the link address of the cable interface) received from the CMTS to the CMTS ID from the information retrieved from the ROC data base as indicated by blocks 314 and 316. The comparison of these two sets of values determines if the data is from the same or from different CMTS systems.

If the CMTS IDs match, a check is made as indicated by block 321 to determine if LB flag is set, indicating that the CMTS has changed US or DS ports. If the flag is set, the data base in the ROC is updated with the new location information for the cable modem, as indicated by block 325. As indicated by block 331, this means that the modem is not a clone as far as the ROC is concerned and the information goes to the NOC as indicated by block 333.

If the check indicated by block 316 indicates that the two CMTS ID do not match, the ROC commands the old CMTS (that is, the CMTS that identified in the stored data) to perform a clone detection operation. If no clone is detected, the data base in the ROC is updated as indicated by block 325. If a clone is detected appropriate action is taken as indicted by block 332 and 334.

It is noted that in an alternate embodiment, the ROC stores all the detailed data concerning a cable modem's location as well as the CMTS ID. In such an embodiment, the ROC can perform a comprehensive clone detection operation for all cable modems when the ROC receives a request from a CMTS. In such an embodiment, it is not necessary for the ROC to command a CMTS to perform a clone detection operation even if the CMTS has not performed clone detection. In such an embodiment, the ROC only needs to command the old CMTS to perform a DOCSIS ping when a duplicate record is detected by the RIOC.

The third level of cable modem move detection is at the global level, i.e., at the Network Operations Center (NOC). The operations performed at the NOC are illustrated in FIG. 4.

Like at the ROC, the clone detection process at the NOC performs a clone detection operation. The ROC sends a clone detection request to the NOC, identifying the ROC, the link address of the cable interface (that identifies the CMTS), and the CM's physical location, along with the CM's MAC address. The NOC clone detection process stores these data in a datastore. This is indicated by block 401.

Checks are made as indicated by block 402 and 403 to determine if clone detection is enabled on the NOC and to determine if the ROC has performed clone detection. If the ROC did not perform clone detection, the NOC commands the ROC to perform clone detection as indicated by block 405.

If the ROC previously performed clone detection (block 403) and if no clone is detected as a result of a commanded clone detection operation (block 409) the process moves to block 407.

As indicated by block 407, the NOC clone detection process looks up in the NOC datastore, the identity of the ROC associated with the MAC address of the cable modem seeing to register. If no record is found, then the cable modem is new to the service provider's deployment, and thus no clone is detected and the process ends as indicated by block 435. If a record is found in the datastore, then the NOC clone detection process retrieves the ROC identifier associated with the cable modem MAC address as indicated by block 414. The NOC process then compares the stored ROC identifier with that of the ROC that has sent the request to determine if they match as indicated by block 416. If the stored ROC identifier is identical to that of the requesting ROC, then the cable modem has not moved, no clone is detected, and the process ends.

If the two identifiers are different, then the cable modem may have moved or a clone has appeared. In this case the NOC issues a command to the old ROC (that is the ROC identified in the database) to perform a clone detection operation as indicated by block 418. The ROC in turn commands the appropriate CMTS to perform clone detection. If no clone is detected, then the cable modem has moved to a new physical location. In this case the data in the NOC data base is updated as indicated by block 422. If a clone is detected action is taken as indicated by block 432 and 436.

In the embodiment described herein, the NOC clone detection illustrated in FIG. 4 is the last level of clone detection. It is, however, noted that in other embodiments there may be other levels of clone detection. In such embodiments, the other levels of clone detection would follow the same techniques as described above.

The overall operation of the system can be divided into three parts, namely (1) Move detection, (2) Physical location verification, and (3) Dealing with the clone. A modem seeking connection to a CMTS can be termed a CM-SC. A modem that was previously registered on a CMTS can be termed a PR-CM. As explained above, the move detection at the CMTS, the ROC, and the NOC is accomplished by comparing the location data for a CM-SC (that is, a modem with a particular MAC address that is seeking access) to location data previously stored concerning a PR-CM that has the same MAC address, (this is, a previously registered cable modem with the same MAC address). If the locations are the same, the modem is not a clone.

However, when the stored data and the new data differ as to physical location, a verification process is performed. This verification process involves, issuing a DOCSIS ping (or a DOCSIS path verification of some other kind) to the cable modem as indicated by block 210 in FIG. 2. It is noted that this same principle applies to the detection process at the ROC and NOC; however, it is performed by sending a command to the ROC identified in the previously stored data, as indicated by block 322 in FIG. 3 or 418 in FIG. 4. The operations at the ROC and NOC must take into account the region in which the PR-CM is registered (termed a PR-CM-R). At the NOC, the system must take into account if a modem was previously registered in the entire network (termed CM-PR-N).

As to the third step, that is, dealing with the clone: The clone detection system can provide a method to shut down cable modems that are clones. This command shuts down both DS and US traffic going through the cable modem.

When a clone is detected, the clone detection system in the embodiments illustrated herein consults with the operator's backend system to resolve which cable modem entity is the original and which one is the clone. For example, the backend system may contain in the data indicating that the cable modem can only be used in certain places (specific US/DS, a specific CMTS, or specific region). Then, the system can determine that the cable modem entity outside the specified location is the clone. The operator then can use the clone detection system to issue a command to the CMTS where the cloned cable modem is attached to shut down the clone. The shut down command is issued from the level where the clone is detected.

If the operator's backend system cannot provide information to distinguish the original cable modem and the clone, then how to deal with the cable modem is a policy decision on the part of the operator. For example, the system can be configured to either: shut down both cable modems, shut down the new cable modem, shut down the old cable modem, or shut down none of them. In an alternate embodiment, the system shuts down the potential clone for 3-4 minutes if the operator is not certain which duplicate is the clone to avoid prematurely shutting down the legitimate cable modem permanently.

In the embodiment described in detail above, the clone detection process takes into consideration whether or not a load balancing operation has changed the DS and US port location descriptors of a modem. In an alternate embodiment, the system also takes into account changes that occur due to other operations that a CMTS performs. In some situations, a CMTS can issue UCC (Upstream Channel Change) commands and DCC (Downstream Channel Change) commands that create a new interface for a cable modem. In this alternate embodiment in addition to sending a flag indicating that a LB operation has occurred, a flag is sent indicating if a UCC or DCC change has occurred. It is noted that the clone detection technique described herein can take into account any operation that has changed a cable modem interface.

FIG. 5 is block diagram illustrating the relevant parts of the CMTS server 20 shown in FIG. 1A. The CMTS has an HFC interface 510 to the ROC and an HFC interface 530 that connects to a number of cable modems. Operations in the CMTS are controlled by a processor 520 that operates based upon programs and data stored in memory 540. Memory 540 stores configuration information 540-A and programs 540B that control the normal operations that the CMTS performs. Of special interest is program 540C that is stored in the memory and that is used to perform the clone detection process shown in FIG. 2. Data store 540D stores the MAC address and location of cable modems registered on the CMTS system.

FIG. 6 is a block diagram of DHCP server 39A illustrated in FIG. 1B. It is noted that DHCP server 39A is representative of the other ROC servers illustrated in FIG. 1B. The server 39A has an interface 610 to the various CMTS's in the region and an interface 630 to the NOC 99. It is noted that the server may have other interfaces usual to a DHCP server. The DHCP server includes a processor 620 and a memory 640 (termed a ROC-MEM). The memory 640 stores programs 640B that performs the normal operations that a DHCP server performs and a configuration data file 640A. Server 39A also includes clone detection program 640C and data store 640D that are used to perform the operations illustrated in FIG. 3.

FIG. 7 is a block diagram of the server 99A in NOC 99 illustrated in FIG. 1B. This server is the server that runs the clone detection process in the NOC which is described above. This could be a separate server for this purpose; however, it can also be a server that is normally in the NOC for some other purpose The server 99A has an interface 710 to the various ROC's in the system. It is noted that the server 99A may have other interfaces that are usual for other purposes, if the server runs other processes. The clone detection server 99A includes a processor 720 and a memory 740 (termed a NOC-MEM). The memory 740 stores configuration data 740A, and programs 740B that performs the other normal operations that the server performs. Server 99A also includes clone detection program 740B and data store 740C that are used to perform the operations illustrated in FIG. 4.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method, comprising:

detecting if a cable modem seeking connection (CM-SC) to a first cable modem termination system (CMTS) has the same media access control (MAC) address as any cable modems previously registered (PR-CM) on said first CMTS, if said CM-SC has the same MAC address as a PR-CM, determining if the location of the CM-SC is the same as a last-known location of the PR-CM, wherein the location of the CM-SC is specified by the cable interface on which the CM-SC appears and at least one of the US port on the interface that services the CM-SC, the DS port on the interface that services the CM-SC, the Fiber Node (FN) serving the CM-SC, and the Load Balancing (LB) group descriptor of the CM-SC on the CMTS, and if said locations differ, sending a ping to the last-known location of said PR-CM, whereby if said PR-CM responds to said ping, it is determined that said CM-SC is a clone based on two different cable modems, the CM-SC and the PR-CM, having the same MAC address but existing in two different physical locations simultaneously, and if said PR-CM does not respond to said ping, it is determined that said CM-SC is in fact said PR-CM at a new location.

2. The method of claim 1 including, if the MAC address of said CM-SC is not the same as the MAC address of any PR-CM, determining if said CM-SC has the same MAC address as cable modems previously registered in a first region (CM-PR-R) that includes said first CMTS and at least one other CMTS, if said CM-SC has the same MAC address as a CM-PR-R, determining if the location of said CM-SC is the same as a last-known location of the CM-PR-R, and if said locations differ, sending a ping to the last-known location of said CM-PR-R to determine if said CM-SC is the CM-PR-R or if said CM-SC is a clone modem.

3. The method of claim 2 wherein, if the MAC address of said CM-SC is not the same as the MAC address of any CM-PR-R, said method includes:

determining if said CM-SC has the same MAC address as cable modems previously registered in a network (CM-PR-N) that includes said first region and at least one other region, if said CM-SC has the same MAC address as the CM-PR-N, determining if the location of said CM-SC is the same as a last-known location of the CM-PR-N, and if said locations differ, sending a ping to the last-known location of said CM-PR-N to determine if said CM-SC is the CM-PR-N or if said CM-SC is a clone modem.

4. The method in claim 1 wherein said last-known location of said PR-CM is specified by the cable interface on which the PR-CM appears and includes at least one from the following group:

the US and DS ports on the interface that service the PR-SC, the Fiber Node (FN) serving the PR-SC, and the Load Balancing (LB) group descriptor of the PR-SC on the CMTS.

5. The method of claim 1 including storing in said CMTS the MAC address and last-known location of the PR-CMs on said CMTS.

6. The method recited in claim 1 including, determining if a load balancing operation has changed an interface location of a PR-CM, and if so updating the last-known location of said PR-CM.

7. The method recited in claim 1 including, determining if a Upstream Channel Change (UCC) command or if a Downstream Channel Change (DCC) command has changed an interface location of a PR-CM, and if so updating the last-known location of said PR-CM.

8. The method recited in claim 1 including, determining any action has changed an interface location of a PR-CM, and if so updating the last-known location of said PR-CM.

9. A method, comprising:

storing in a memory associated with a cable modem termination system (CMTS) a media access control (MAC) address and a last-known location of cable modems previously registered (PR-CMs) on said CMTS system, determining a current MAC address and a current location of a cable modem that attempts to connect to said CMTS system, wherein the current location is specified by at least one of a port on an interface that services the cable modem, a Fiber Node (FN) serving the cable modem, and a Load Balancing (LB) group descriptor on said CMTS system, determining if any of said previously registered cable modems had said current MAC address, retrieving from said memory the last-known location of the previously registered cable modems that had said current MAC address, and comparing the last-known location of a previously registered cable modem that had said current MAC address to said current location and, if said compared addresses differ, sending a ping to the last-known location of said previously registered cable modem and determining whether a load balancing flag is set to determine if two different modems with said current MAC address are simultaneously connected to said CMTS or if said PR-CM has moved to a new location.

10. The method recited in claim 9 where said CMTS is one of a group of CMTSs in a region that includes a plurality of CMTSs, each CMTS having an ID (CMTS-ID) and said region having a Regional Operating Center (ROC), comprising:

storing in a memory associated with said ROC (ROC-MEM) a media access control (MAC) address and the CMTS-ID of cable modems previously registered on CMTSs in said ROC (CM-PR-R), determining if any of said CM-PR-R had said current MAC address, retrieving from said ROC-MEM the CMTS-ID of a CM-PR-R that had said current MAC address, and having the CMTS with said retrieved CMTS-ID compare a last-known location of the CM-PR-R that had said current MAC address to said current location and, if said compared addresses differ, sending a ping to the last-known location of said CM-PR-R to determine if two different modems with said current MAC address are connected to said ROC.

11. The method recited in claim 10 where said ROC is one of a group of ROCs in a network that includes a plurality of ROCs, each ROC having an ID (R-ID) and said region having a Network Operating Center (NOC), the steps of storing in a memory associated with said NOC (NOC-MEM) the media access control (MAC) address and R-ID of cable modems previously registered on said NOC (CM-PR-N), determining if any of said CM-PR-N had said current MAC address, retrieving from said NOC-MEM the R-ID of said a CM-PR-N that had said current MAC address, and having said NOC with said R-ID compare a last-known location of the CM-PR-N that had said current MAC address to said current location and, if said compared addresses differ, sending a DOCSIS ping to the last-known location of said CM-PR-N to determine if two different modems with said current MAC address are connected to said NOC.

12. A method to detect a cloned cable modem, comprising:

establishing a connection from a particular cable modem to a cable modem termination system (CMTS), said CMTS storing media access control (MAC) addresses of modems to which connections are established and associated last-known physical location of modems whose MAC address is stored;

checking if a MAC address for said particular cable modem is stored in said CMTS; and if said MAC address is stored in said CMTS, determining if an associated physical location of said particular cable modem is the same as a last-known physical location of a modem having the same MAC address stored in said CMTS, wherein the associated physical location is specified by a cable interface and at least one of an upstream port on the interface, a downstream port on the interface, a fiber node serving the cable modem, and a load balancing group descriptor on the cable modem termination s stem and, responsive to determining that the associated physical location of said particular cable modem is the same as the last-known physical location of the modem having the same MAC address stored in said CMTS, sending a ping to the last-known physical location of the modem having the same MAC address stored in said CMTS, whereby a determination can be made as to whether or not said particular cable modem may be a clone based at least in part on at least one of the sending and a determination as to whether a load balancing flag is set.

13. The method of claim 12 further comprising establishing internet protocol connectivity through a server and sending information to the server to detect a clone.

14. The method of claim 13 wherein the information includes an internet protocol address identifying a link address of a cable interface where a dynamic host configuration protocol client message is received from the cable modem, a new upstream and downstream port that the cable modem has moved to for load balancing, a clone detection sub option indicating if the cable modem termination system has performed clone detection, and a physical location sub option including the physical location information.

15. The method of claim 14 further comprising sending the media access control address of the cable modem, the link address of the cable interface, and physical location information for the cable modem to a regional operations center to detect clones at the regional operations center level.

16. A method of detecting whether a cable modem seeking connection (CM-SC) to a cable modem termination system (CMTS) is a clone, comprising:

storing in said CMTS a MAC address and a last-known location for each of a plurality of cable modems previously registered with said CMTS (PR-CM), determining a MAC address and a location of said CM-SC, wherein the location of the CM-SC is specified by the cable interface on which the CM-SC appears and at least one of the US port on the interface that services the CM-SC, the DS port on the interface that services the CM-SC, the Fiber Node (FN) serving the CM-SC, and the Load Balancing (LB) group descriptor of the CM-SC on the CMTS, comparing the location of said CM-SC to the last-known location of any PR-CM having the same MAC address as said CM-SC, and if said locations differ, sending a ping to the last-known location of said PR-CM, whereby if said PR-CM responds to said ping, it is determined that said CM-SC is a clone based on two different cable modems, the CM-SC and the PR-CM, having the same MAC address but existing in two different physical locations simultaneously, and whereby if said PR-CM does not respond to said ping, it is determined that said CM-SC is in fact said PR-CM at a new location.

17. The method recited in claim 16 wherein said ping is a ping that verifies the DOCSIS path of said CM-SC.

18. A system, comprising:

a cable modem termination system (CMTS) that includes a memory to store the MAC address and last-known location of cable modems previously registered (PR-CM) on said CMTS, and a processor to (a) determine a MAC address and location of a cable modem seeking connection (CM-SC) to said CMTS, wherein the location of the CM-SC is specified by a cable interface and at least one of a US port on the interface, a DS port on the interface, a Fiber Node (FN) serving the cable modem, and a Load Balancing (LB) group descriptor on the CMTS, (b) compare the location of said CM-SC to the last-known location of any PR-CM having the same MAC address as said CM-SC, and (c) if said locations differ, sending a ping to the last-known location of said PR-CM, whereby, if said PR-CM responds to said ping and if a load balancing flag is set, it is determined that said CM-SC is a clone and, if said PR-CM does not respond to said ping, it is determined that said CM-SC is in fact said PR-CM at a new location.

19. The system recited in claim 18 wherein if the MAC address of said CM-SC does not match the MAC address of any PR-CM, said processor is adapted to send the MAC address and location of said CM-SC to a Regional Operating Center (ROC) serving said CMTS.

20. The system recited in claim 19 wherein said ROC includes a memory to store a MAC address and a last-known location of cable modems previously registered in the region of said ROC (PR-CM-R), and a processor to (a) compare the location of said CM-SC to the last-known location of any PR-CM-R having the same MAC address as said CM-SC, and (c) if said locations differ, having the CMTS serving the region of said PR-CM-R send a ping to the last-known location of said PR-CM-R, whereby, if said PR-CM-R responds to said ping, it is determined that said CM-SC is a clone and, if said PR-CM-R does not respond to said ping, it is determined that said CM-SC is in fact said PR-CM-R at a new location.

* * * * *

UNITED STATES PATENT AND TRADEMARK OFFICE
CERTIFICATE OF CORRECTION

PATENT NO.       : 7,957,305 B2
APPLICATION NO.  : 11/465107
DATED            : June 7, 2011
INVENTOR(S)      : Shengyou Zeng et al.

It is certified that error appears in the above-identified patent and that said Letters Patent is hereby corrected as shown below:

Column 11, line 58, delete the word "includes";
Column 12, line 63, the word "of" should read -- of: --;
Column 13, line 30, the words "s stem" should read -- system, --.

Signed and Sealed this
Twenty-eighth Day of February, 2012

David J. Kappos
*Director of the United States Patent and Trademark Office*